United States Patent [19]
Besuden et al.

[11] 3,877,505
[45] Apr. 15, 1975

[54] UPPER BEAD BREAKER MECHANISM

[76] Inventors: David W. Besuden, 6800 Tupelo Ln., Cincinnati, Ohio 45243;
William G. Brosene, Jr., 9664 Lansford Dr., Cincinnati, Ohio 45242

[22] Filed: May 13, 1974

[21] Appl. No.: 469,122

Related U.S. Application Data

[63] Continuation-in-part of Ser. No. 328,008, Jan. 30, 1973, abandoned.

[52] U.S. Cl. .............................................. 157/1.28
[51] Int. Cl. ............................................ B60c 25/06
[58] Field of Search ....... 157/1.17, 1.24, 1.26, 1.28, 157/1.1

[56] References Cited
UNITED STATES PATENTS

| | | | |
|---|---|---|---|
| 3,064,718 | 11/1962 | Brosene, Jr. | 157/1.28 |
| 3,255,800 | 6/1966 | Strang et al. | 157/1.24 |
| 3,504,727 | 4/1970 | Scott | 157/1.24 |

*Primary Examiner*—Al Lawrence Smith
*Assistant Examiner*—Harold P. Smith, Jr.
*Attorney, Agent, or Firm*—Wood, Herron & Evans

[57] ABSTRACT

An upper bead breaker for use with an automatic tire changer machine. The upper bead breaker's blade follows a programed, discretely defined, controlled path of motion as it functions to break a pneumatic tire's bead from a wheel's rim in response to resistance provided by the tire as the upper bead breaker is moved downwardly relative to the tire. The upper bead breaker blade's travel path is comprised of three discrete segments relative to a tire and wheel held in a horizontal position on, i.e., laid flat on, the machine's table, that path including a first segment that is vertically downward to locate the blade's lip beneath the rim's outer wall, a second segment that is radially inward to locate the blade's lip over the tire's bead, and a third segment that is vertically downward to break the tire's bead away from the wheel's rim. This programed and controlled path is dictated solely by the upper bead breaker's structure, and is accomplished by interconnecting the upper bead breaker's blade with the machine's power source and with the wheel's rim through a novel structural arrangement that allows the path to be traversed while the blade's leading edge is maintained in close proximity to the outer surface of the wheel's rim, thereby insuring that the tire's bead will be broken away from the wheel's rim, i.e., removed from the seat defined by the wheel's rim.

8 Claims, 9 Drawing Figures

UPPER BEAD BREAKER MECHANISM

This application is a continuation-in-part of U.S. application Ser. No. 328,008, now abandoned, filed Jan. 30, 1973 and assigned to the assignee of this application.

This invention relates to automatic tire changer machines. More particularly, this invention relates to an improved upper bead breaker mechanism for an automatic tire changer machine.

The mounting of a pneumatic tire on a wheel, and the demounting of a pneumatic tire from a wheel, used to be done totally by hand. Such provided major problems for an operator in that a pneumatic tire's beads are relatively inflexible. In mounting a tire on a wheel, the tire's beads must somehow be disposed over one of the wheel's rims into the wheel's well area so as to positively locate the tire on the wheel. In demounting the tire from the wheel, the tire's beads must be somehow removed from the wheel's well area over one of the wheel's rims so that the tire is free of the wheel. Over the years, a number of different types of automatic tire changing machines have been developed which provide means to mechanically assist an operator in mounting a tire onto, and demounting a tire from, a wheel. Thus, the main objective of an automatic tire changer machine is to aid an operator in demounting a worn or undesirable pneumatic tire from a wheel, and to aid an operator in mounting a new pneumatic tire onto a wheel. Most such tire changing machines include the structural components generally described below.

Generally speaking, the major structural components of an automatic tire changer machine include a horizontally disposed table on which the wheel is initially positioned, an automatically rotatable centerpost that extends up from the table through the center of the wheel, and a mount/demount tool that functions to lift on old tire's beads over the rim off the wheel when the old tire is being demounted, and to seat a new tire's beads over the rim onto the wheel when the new tire is being mounted. The mount/demount tool is interconnected with the centerpost, and is mechanically rotated relative to the wheel through that interconnection, to aid an operator in performing the tire mounting and demounting functions.

In mounting a tire on a wheel, the tire tool (the mounting head of which cooperates with the wheel's rim and the tire's bead to aid in locating the beads one at a time within the wheel's well area) is cooperatively engaged with the centerpost. The tire tool extends outward from the centerpost in a radial fashion, the centerpost in effect providing a vertical axis about which the tire tool is rotated for a single revolution, as well as providing the drive means to work the tool's mounting head around each bead to locate that bead over the wheel's rim. Of course, a suitable power unit must be drivingly connected with the centerpost so that same can be mechanically rotated about its vertical axis.

In demounting a tire from a wheel, the tire tool (the demounting head of which cooperates with the tire's beads to aid in lifting the beads one at a time over the wheel's rim so as to free the tire from the wheel) is also cooperatively engaged with the centerpost. The tire tool likewise extends outward from the centerpost in a radial fashion, the centerpost again providing the vertical rotational axis for the tire tool as the tool's demounting head is worked around each bead to lift that bead over the wheel's rim and off the wheel. The same power unit is employed to rotate the centerpost whether the tool's mounting head or demounting head is cooperatively engaged with the wheel.

In addition to the structural components previously mentioned, the more advanced automatic tire changer machines also make use of a lower bead breaker and an upper bead breaker. These bead breakers are used only when demounting a tire from a wheel, i.e., are not used when mounting a tire onto a wheel. As is generally known, penumatic tires are provided with a substantial degree of air pressure inside, and that air pressure must be relieved prior to removing or demounting the tire from the wheel with the tire tool previously referred to. Further, and particularly in the case of tubeless penumatic tires, the tire's upper and lower beads (as the tire lies horizontally on the machine's table) are stuck to some extent, i.e., are sealed, against the wheel's upper and lower rims, respectively. Thus, the tire's beads must be broken away from the wheel's rims prior to removing the tire from the wheel during the demounting operation. The tire tool is used to demount the tire from the wheel, as previously explained, subsequent to breaking of the tire's beads from the wheel's rims.

The upper and lower bead breakers are mechanically operated by a power unit to perform the breaking function, i.e., to break the tire's upper and lower beads from the wheel's upper and lower rims. In the more advanced automatic tire changer machines the upper and lower bead breakers are in the nature of jaws which are initially positioned adjacent the tire's upper and lower beads, respectively, and which are then caused to move toward one another relatively simultaneously so as to compress the beads toward one another (i.e., toward the center plane of the wheel and away from the rims of the wheel), thereby breaking the tire's beads away from the wheel's rims and totally depressurizing the tire.

However, there is one major problem associated with upper bead breakers of the prior art. This major problem arises during operation of the upper bead breaker. In theory, it is a primary objective of the upper bead breaker's blade to follow the outer contour of the wheel's outer rim surfaces so as to completely and efficiently break or force the tire's bead out of the seat defined by the wheel's rim down into the well area of the wheel, thereby preparing the tire for subsequent removal from the wheel by a mount/demount or tire tool in the manner previously explained. In practice, this has been attempted by providing structure that purportedly causes the upper bead breaker's blade to track against the outer surfaces of the wheel's rim. However, the upper bead breaker mechanisms known to the prior art do not always accomplish this tracking objective on a reliable basis. Indeed, a typical upper bead breaker's blade of the prior art may well tend to move radially outward or away from the wheel's outer rim surfaces as the upper bead breaker is moved downwardly toward the center plane of the wheel from its initial position (where the upper bead breaker's blade rests on the top side wall of the tire). This for the reason that the resistive forces encountered by the upper bead breaker's blade (as provided by the pneumatic tire) in its operational or motion path tend to force the blade radially outward (as opposed to a desired radially inward path where it would track on a wheel's outer rim surfaces) as the blade is moved downwardly by the machine's power source. This tendency of the upper bead breaker's blade to roll back or creep back along the tire's side wall away from the tire's bead reduces the effectiveness of the upper bead breaker in breaking the tire's bead away from the wheel's rim. Further, this tendency may lead to undesirable scuffing or wearing of the tire's upper side wall as the upper bead breaker's blade slides or slips radially outward on the tire's side wall.

Therefore, it has been one objective of this invention to provide a novel upper bead breaker mechanism for an automatic tire changer machine that provides a blade which moves in a programed, discretely defined, controlled path of motion, which is reproducible time after time upon repeated operation of the upper bead breaker mechanism, as it functions to break a pneumatic tire's bead away from a wheel's rim in response to resistance provided by the tire as the upper bead breaker is moved downwardly relative to the tire.

It has been another objective of this invention to provide a novel upper bead breaker mechanism for an automatic tire changer machine where the upper bead breaker blade's travel path is comprised of three discrete segments relative to a tire and wheel held in horizontal position on, i.e., laid flat on, the machine's table, that path including a first segment that is vertically downward to locate the blade's lip beneath the rim's outer wall, a second segment that is radially inward to locate the blade's lip over the tire's bead, and a third segment that is vertically downward to break the tire's bead away from the wheel's rim.

It has been still a further objective of this invention to provide a novel upper bead breaker mechanism for an automatic tire changer machine having a programed and controlled path that is dictated solely by the upper bead breaker's structure, and that is accomplished by interconnecting the upper bead breaker's blade with the machine's power source and with the wheel's rim through a novel structural arrangement that allows the path to be traversed while the blade's leading edge is maintained in close proximity to (but does not track upon) the outer surface of the wheel's rim.

In accord with these objectives, this invention provides an upper bead breaker that includes a locater housing pivotally connected to a support arm, the locater housing mounting a hook adapted to be received in the inner seat defined by a wheel's rim and well, thereby positively locating and maintaining the upper bead breaker in operational relation with the wheel's rim and the tire's upper bead. The support arm is mounted to a power column, the power column being connected with the machine's power source for driving the upper bead breaker's support arm (and, hence, the upper bead breaker) downwardly against resistance provided by the tire.

The upper bead breaker includes a blade also pivotally connected to the support arm. The upper bead breaker's blade carries a lock bolt adapted to cycle out of a lock notch defined by the locater housing, the lock bolt being retained in the lock notch when the upper bead breaker is in the starting position and being gradually moved from the lock notch as the upper bead breaker's blade is moved downwardly until the lock bolt is totally free therefrom. This relative motion of the lock bolt and lock notch occurs because the upper bead breaker's blade and locater housing are pivotally connected at independent locations to the support arm, the blade being prevented from pivotal motion relative to the support arm by the lock notch/lock bolt until the locater housing has pivoted relative to the support arm (as the upper bead breaker is moved downwardly to that position where the lock bolt is withdrawn from the lock notch. Thus, the first segment of the path followed by the blade's leading edge is defined with that segment terminating when the blade's lock bolt falls entirely out of interengagement with the housing's lock notch. This first segment of the path is vertically downward relative to the plane of the wheel because the lock notch/lock bolt structure prevents any radially inward or radially outward motion of the upper bead breaker's blade, and is powered by the machine's power source. This first segment translates the blade's leading edge from a starting position above the wheel rim's outer edge to a position beneath the wheel rim's flange.

The pivotal connection of the upper bead breaker's blade is carried in a slot defined in the support arm, the blade also being interconnected with the support arm by an over-center linkage positioned to induce radially inward motion into the blade. The pivotal interconnection of the blade with the support arm is located at the radially outward end of the slot when the lock bolt is captured within the lock notch during the first segment of the blade's travel path. When the lock bolt is freed from the lock notch, the over-center linkage allows the blade's leading edge to move radially inward beneath the wheel rim's flange to a point closely adjacent the wheel rim's floor. This radially inward movement is stopped when the blade's pivotal interconnection with the arm reaches the radially inward end of the slot, and when the blade's structure abuts a stop block fixed to the support arm. This second or radially inward segment of the blade's leading edge is powered by the upward resistance generated by the tire against the downwardly proceeding blade, thereby tending to pivot the over-center linkage (and, hence, the upper bead breaker's blade) inward as the blade's pivotal interconnection with the support arm moves toward the radially inward end. This second path segment locates the blade's leading edge or lip over the tire's bead i.e., causes the upper bead breaker's lip to overlie the tire's bead.

Once the upper bead breaker's blade has interengaged the support arm's stop block, the upper bead breaker's blade and support arm becomes a unitary mass (i.e., the blade no longer pivots relative to the support arm), and continues being moved downwardly by the machine's power source. This provides the third segment of the travel path for the upper bead breaker blade's leading edge. The blade's leading edge is maintained in proximity to the wheel rim's floor during this third segment by the locater housing's hook which remains seated in the inside surface seat defined between the wheel's rim and well. Further, this third segment serves to completely break the tire's bead away from the wheel's rim.

Other objectives and advantages of this invention will be more apparent from the following detailed description taken in conjunction with the drawings in which.

GENERAL STRUCTURE OF AUTOMATIC TIRE CHANGER MACHINE

The improved upper bead breaker mechanism 10 of this invention is illustrated in its structural environment in the Figures. As shown in the Figures the improved upper bead breaker 10 is structurally integrated with an automatic tire changer machine 11.

Figure 1:
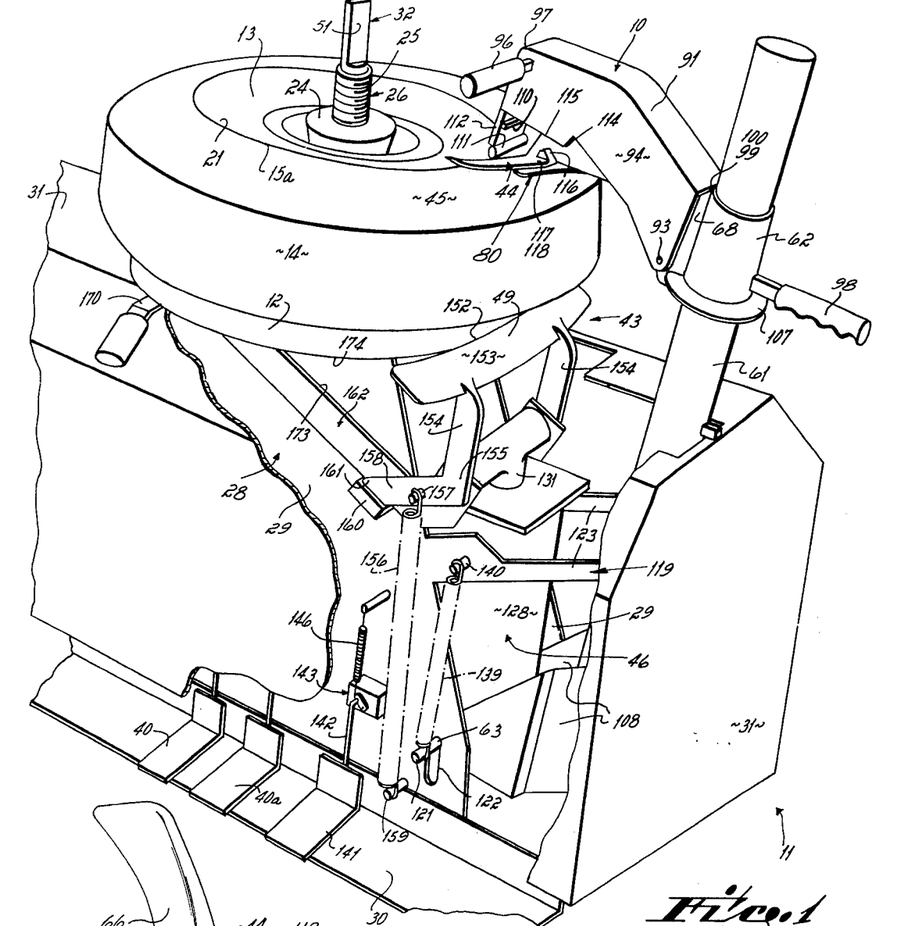
FIG. 1 is a partially broken away perspective view illustrating an automatic tire changer machine that incorporates an upper bead breaker mechanism in accordance with the principles of this invention.
Figure 5:
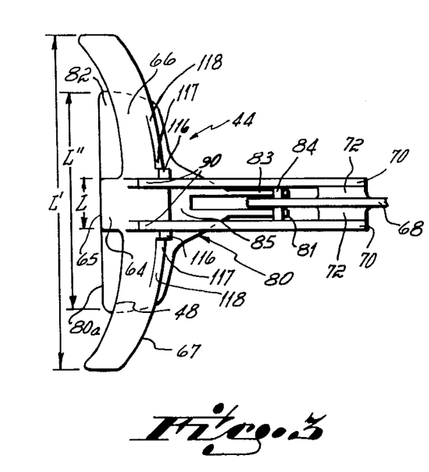
FIG. 5 is a partial side view of the automatic tire changer machine shown in FIG. 1, but with a portion of the machine's shroud removed.
Figure 6:
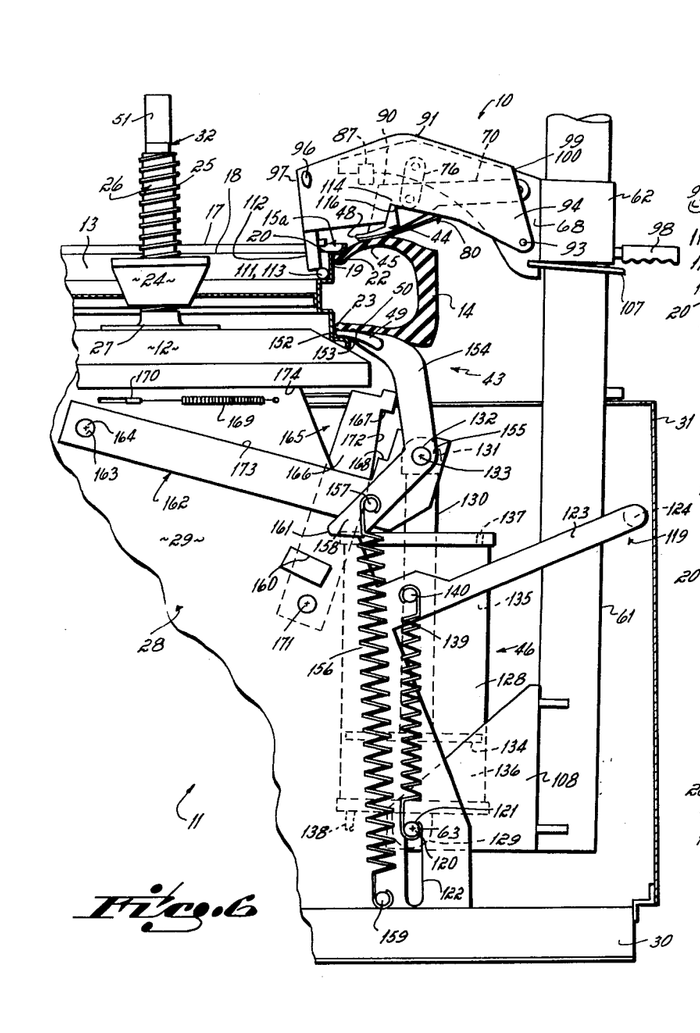
FIG. 6 is a side view similar to FIG. 5 (but with a portion of the machine not shown) in which the upper and lower bead breakers are shown in an intermediate operating position.

The automatic tire changer machine 11 includes a horizontally disposed table 12 adapted to receive a wheel 13 having a fully inflated pneumatic tire 14 mounted thereon, see FIGS. 1, 5 and 6. The wheel 13 includes a rim 15 portion on each side of a well 16 portion, each rim portion having an outer edge 17, a flange 18 and a floor 19. Each rim's flange 18 and floor 19 defines a seat 20 on the wheel's outer surface 21 for a tire's upper bead 22 and lower bead 23, respectively.

The wheel 13 is held in fixed position on the table 12 by a hold-down cone 24, the hold-down cone being threadedly engaged with exteriorly threaded (as at 25) cylinder 26. The cylinder 26 is immobily mounted to the table 12 by collar 27.

The table 12 itself is supported on and fixed to the machine's main frame 28, see FIGS. 1 and 5. The main frame 28 includes parallel and spaced apart side walls 29, that terminate in and are fixed to flanged feet 30. The feet 30 extend the length of the machine 11 and are adapted to be bolted to a concrete floor in, e.g., a gasoline station, to provide stability for the machine during its operational cycle. A shroud 31 is fixed to the main frame for enclosing the operational structure, e.g., power units, of the machine 11.

A centerpost 32 extends vertically upward from beneath the table 12 to a terminal point above the wheel 13. The rotatable centerpost 32 is coaxially and interiorly located relative to the fixed threaded cyclinder 26. The outside diameter of the centerpost 32 is sized relative to the inside diameter of the threaded cylinder 26 so that the centerpost can easily rotate relative thereto in either the clockwise or counterclockwise direction. The centerpost 32 is mounted to the machine's main frame 28 at its lower end portion between opposed plates 33 that connect side walls 29 of the frame (by being welded between the frame's side walls), each of the plates mounting a bearing block 34 which receives the centerpost. Thus, the centerpost 32 is supported for rotation at spaced locations adjacent its lower end portion by means of the two bearing blocks 34, and is supported for rotation adjacent its upper end portion by virtue of passing through threaded cylinder 26. The centerpost 32 carries a pinion gear 35, the gear being located on the centerpost between the bearing blocks 34 and being drivingly connected with the first or centerpost power unit 36.

The first or centerpost power unit 36 is fixed to the machine's main frame plates 33 in driving relation with the centerpost's pinion gear 35. The first power unit 36 includes a straight rack 37, fluid motor 38, and a pair of shock absorbers 39, see FIG. 5. Note that the linear rack 37 is oriented transverse to the centerpost 32, i.e., the linear rack is adapted to reciprocate in a horizontal path and the centerpost is adapted to rotate about a vertical axis. The linear rack 37 is directly fixed to the fluid motor's piston (not shown), the fluid motor being a pneumatic motor (although it may be a hydraulic motor, if desired) capable of being operated by high pressure air such as is commonly found in gasoline stations and the like. Rotation of the centerpost 32 and, hence, rotation of a tire tool (not shown), is operator controlled through foot pedals 40, 40a. The first power unit 36 for rotating the centerpost 32 is particularly disclosed in U.S. Pat. application Ser. No. 328,016, entitled CENTERPOST DRIVE MECHANISM, invented by William G. Brosene, Jr., filed Jan. 30, 1973.

Figure 4:
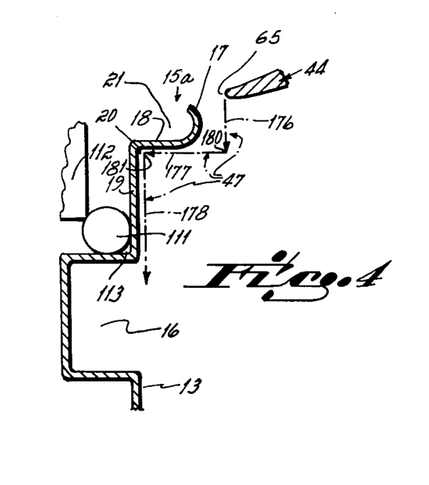
FIG. 4 is a diagrammatic view illustrating the travel or motion path of the upper bead breaker blade's lip as programed and controlled by the upper bead breaker of this invention.

The automatic tire changer machine 11 also includes upper 10 (as mentioned) and lower 43 bead breakers. The upper 10 and lower 43 bead breakers are adapted to move toward one another in general travel paths 41, 42, respectively, that are substantially vertical relative to the horizontal plane of the wheel 13 as the wheel rests on the machine's table 12. Operation of the upper bead breaker 10 is accomplished by moving blade 44 downwardly against the tire's upper side wall 45 adjacent the tire's upper bead 22 by a second or bead breaker power unit 46; the specific path 47 that the leading edge 48 of the blade 44 follows as it moves downward in general path 41 is illustrated in FIG. 4 and that path and the upper bead breaker's structure are described in detail below. Operation of the lower bead breaker 43 is accomplished by moving blade 49 upwardly against the tire's lower side wall 50 adjacent the lower bead 23 by the power unit 46; the operation and structure of the lower bead breaker 43 are more particularly described in U.S. Pat. application Ser. No. 328,017, entitled BEAD BREAKER MECHANISM, invented by John T. Curtis, filed Jan. 30, 1973, now U.S. Pat. No. 3,807,477. The second power unit 46, in effect, both interconnects and powers the two bead breakers 10, 43. This downward motion of the upper bead breaker 10 and upward motion of the lower bead breaker 43 is carried out substantially simultaneously and, in essence, serves to break or separate the tire's upper 22 and lower 23 beads away from the upper 15a and lower 15b rims of the wheel 13 on which the tire 14 is mounted. This prepares the tire for subsequent demounting from the wheel by use of the tire tool (not shown).

As noted, when an operator desires to demount a tire from a wheel, the operator must make use of the upper 10 and lower 43 bead breakers prior to removing the tire 14 from the wheel 13. That is, the tire's beads 22, 23 must be broken away from the wheel's rims 15a, 15b prior to completely removing or demounting the tire from the wheel. After the beads 22, 23 have been broken, the slotted body section of a tire tool (not shown) is engaged with the centerpost's flatted portion 51 so that rotation of the centerpost is translated into rotation of the tire tool. After the tire tool (not shown) has been engaged with the centerpost 32 and after the tire tool's demount head (not shown) has been operatively positioned between a tire's bead and the wheel's upper rim 15a, rotation of the centerpost, i.e., the tire tool's demount head (not shown), causes the tire's bead to be lifted over the wheel's rim so that the tire is totally removed from the wheel. A mount/demount tire tool particularly adapted for use with the automatic tire changer is illustrated in U.S. Pat. application Ser. No. 328,010, entitled MOUNTING HEAD FOR A TIRE TOOL, invented by Donald D. Rainey, filed Jan. 30, 1973, now U.S. Pat. No. 3,823,756.

DETAILED STRUCTURE OF BEAD BREAKER MECHANISM

Upper Bead Breaker

The upper bead breaker 10 is interconnected with power column 61 through collar 62, the power column being directly and pivotally connected, as at 63, with the bead breaker's power unit 46, see FIGS. 5 and 6. The power column 61 functions to draw the upper bead breaker 10 downwardly against the upper side wall 45 of the tire 14 during breaking of the tire's upper bead 22 from the wheel's rim 15a because it is directly connected to the power unit 46 as will be explained in detail below.

Figure 2:
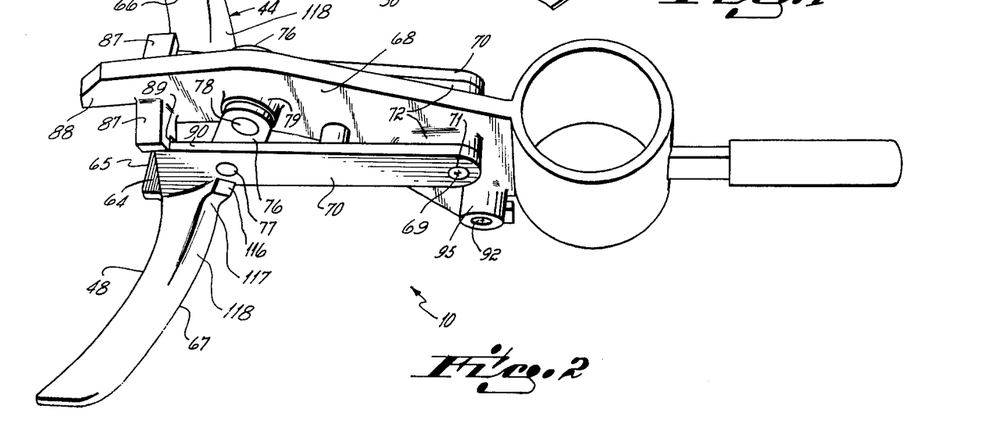
FIG. 2 is a top perspective view illustrating the upper bead breaker of this invention but with the locator housing removed.
Figure 3:
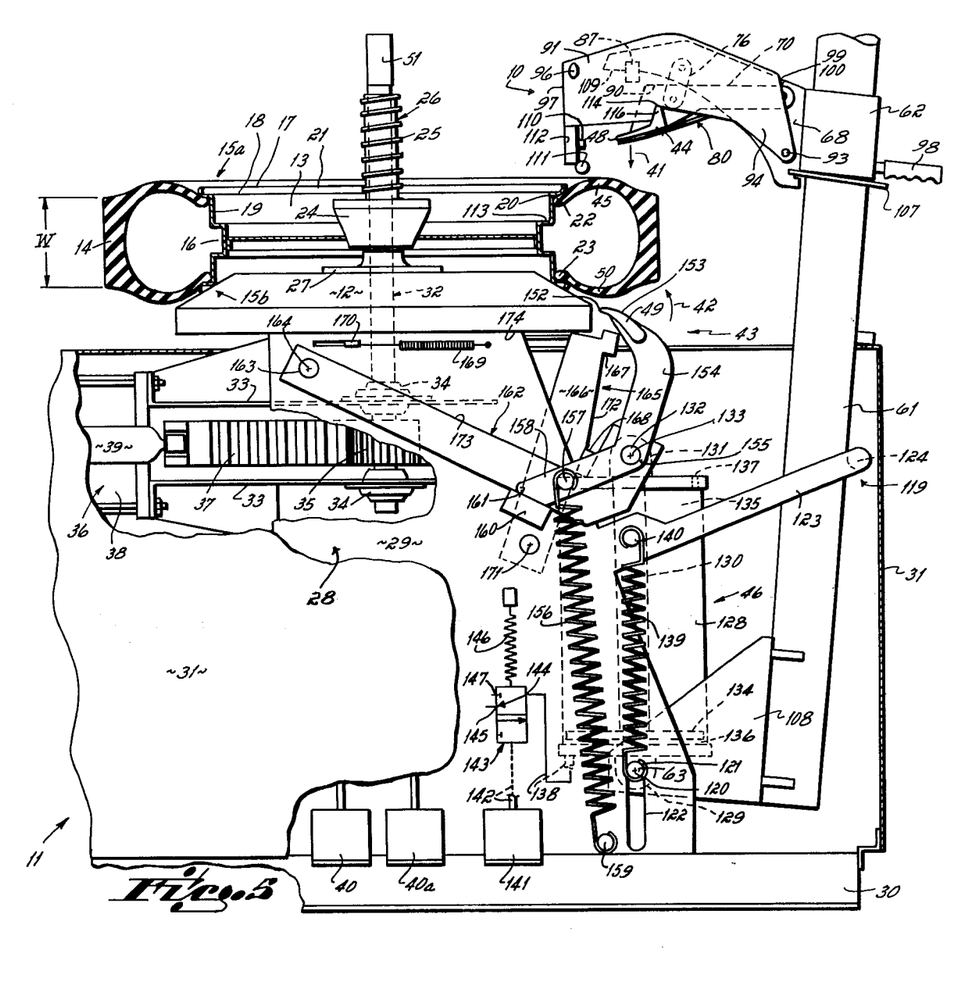
FIG. 3 is a top view illustrating with more particularity the upper bead breaker's blade and the slip shoe.

The upper bead breaker's blade 44 is particularly illustrated in FIGS. 2 and 3. Note that the blade 44 includes a minor lip portion 64 that defines a leading edge 65, the minor lip merging into and being integral with a major lip portion 66 of substantially greater arcuate width than the minor lip portion. It is the minor lip portion 64 of the upper bead breaker's blade 44 that is adapted to overlie the tire's bead 22, the blade's major lip portion 66 overlying the tire's side wall 45, when the blade is finally located in its specific travel path 47 for breaking the tire's bead away from the wheel's rim. Note that the outer periphery 67 of the blade 44 is curved more or less to conform with the outside or tread curvature of the tire, and that the minor lip's length L is about one-fifth the length L' of the major lip.

The upper bead breaker's blade 44 is pivotally connected to a support arm 68 on a slidable pivot axis 69. The upper bead breaker's blade 44 is provided with two parallel arms 70 that extend radially outward therefrom, the outer end of each arm being provided with a pin 71 seated in a boss 72 provided on each side of the centrally located support arm 68 adjacent the collar 62. The bosses 72 provided on each side of the support arm 68 each defines a slot 73 which receives pin 71 fixed at one of the blade's arms 70. Note that the slots are oriented in a plane substantially transverse to the machine's centerpost 32.

The upper bead breaker's blade 44 is also further interconnected with the support arm 68 intermediate its leading edge 65 and its slidable pivot axis 69. This interconnection is achieved with links 76, each of which is pivotally connected at one end (as at 77) to one of the blade's arms 70 and pivotally connected at the other end (as at 78) in boss 79 defined in the support arm 68. The links 76 are of equal length, and are pinned at mirror relation positions on opposite blade arms 70 and on opposite sides of the support arm 68. The linkage 76 arrangement, in combination with the blade's pinned connection 69 with the support arm's slots 73, controls the operative motion path of the upper bead breaker's blade 44 during use thereof as will be described in detail below.

The support arm 68 also includes two stop blocks 87 formed integral therewith, the stop blocks extending laterally outward from each side of the support arm adjacent the nose 88 thereof. Each stop block 87 defines a seat 89 on the underside thereof, each seat being adapted to cooperate with the top edge 90 of a blade's arm 70, thereby limiting the upward (or clockwise as viewed in the Figures) pivotal movement of the upper bead breaker's blade 44 about pivot axis 69. Thus, the pivot axis 69 defined by the pins 71 is movable between the radially outer end 74 of the slots 73 and the radially inner end 75 of the slots (relative to the centerpost 32), thereby allowing the upper bead breaker blade's leading edge 65 to move between a radially outer position (as limited by the radially outer end of the slots and the links 76) and a radially inner position (as limited by the radially inner end of the slots, the links and the stop blocks 87) as will be described in greater detail below.

As shown in FIGS. 3 and 5, a slip shoe 80 is fixed in place as at 81 to the support arm 68, and is adapted to cooperate with the upper bead breaker's blade 44. The slip shoe 80 includes a tongue 82 that extends beneath the upper bead breaker's blade as illustrated in FIGS. 5–9, the tongue terminating in a pair of fingers 83 that extend on each side of the support arm 68 and that are pinned to the support arm by pin 84 that extends through the support arm. The slip shoe 80 is fabricated of spring metal and is fixed to the support arm 68 so that it is spring loaded up against the underside of the upper bead breaker's blade 44 at all times, thereby maintaining continuous contact of the slip shoe's top surface 85 with the blade's bottom surface 86. Note that the slip shoe's leading edge 80a is linear and is located flush with the minor lip's leading edge 65 when viewed from above, see FIG. 3. Also, note that the slip shoe's leading edge 80a is of a length L" about four times the length L of the minor lip's leading edge 65 and about two-thirds the length L' of the blade's major lip 66.

A locater housing 91 that is of inverted U-shaped configuration is adapted to fit over the upper bead breaker arm 70/support arm 68 structure as illustrated in the Figures. This locater housing 91 is pivotally connected to the support arm 68 adjacent collar 62, pin 93 passing through the sides 94 of the housing and being guided through support arm 68 by bosses 95, thereby providing a pivot axis 92 for the locator housing which allows that housing to pivot or move relative to the support arm 68 and relative to the upper bead breaker's blade 44. The locater housing 91 is held in spaced separation from the blade's arms 70 by bosses 95 where same is pinned to the support arm, and by stop blocks 87 that extend outwardly from either side at the nose 88 of the support arm.

The locater housing 91 includes a handle 96 that extends outward from one side wall 94 thereof adjacent its nose 97. The handle 96 is adpated to be gripped by an operator, as the operator also grips handle 98 which extends radially outward from the support collar 62, to aid in lifting the upper bead breaker 10 upwardly along the power column 61 to the desired vertical position thereon. Of course, as the upper bead breaker 10 is so lifted the locater housing 91 tends to pivot upward (or clockwise as viewed in the Figures) about pivot axis 92. Stop block 110 fixed in place to the inside of the housing 91 engages the underedge 109 of the support arm's nose 88 (compare FIG. 7 to FIG. 9) to limit that pivotal movement, thereby providing an integral mass that can be easily lifted upwardly along the power column 61 once the FIG. 9 attitude has been achieved.

The locater housing 91 also includes a restrainer bar 111 rigidly fixed to the locater housing through plate 112 that extends downwardly from and is integral with the housing's nose 97. The bar 111 is a of a length substantially equal to the length L of the blade's leading edge 65. The bar 111 is adapted to be located in the inner seat 113 defined between the wheel's upper rim 15a and the wheel's well 16 when the upper bead breaker 10 is positioned in operational location prior to use thereof on the top side wall 45 of the tire 14 as shown in FIG. 6.

The locater housing's side walls 94 function as a slip lock relative to the upper bead breaker's blade 44 as explained in detail below. The housing's side walls 94 each define a lock notch 114 cut into the bottom edge 115 thereof. Each lock notch 114 is located in a side wall 94 between the pivotal connection 92 of the housing with the support arm 68 and the nose 97 of the housing. Each lock notch 114 is adapted to cooperate with a lock bolt 116 formed integral with the upper bead breaker's blade 44 on the top 117 side thereof. The lock bolts 116 are in the nature of bosses that extend upwardly from the top rim 118 or edge of the upper bead breaker's blade 44 on the outside of the blade's arms 70. The lock bolts 116 on the upper bead breaker's blade are adapted to cooperate with and be received in the lock notches 114 defined in the locater housing's side walls 94 when the upper bead breaker's blade is in the nonoperational and starting positions as shown in FIGS. 5 and 6. In these positions the upper bead breaker's blade 44 is prevented from radial inward movement toward the machine's centerpost 32 since lock notches 114 and lock bolts 116 are engaged only when the blade's pivotal connection 69 with the support arm 68 is abutted against the radially outward end 74 of the slots 74 defined in the support arm. Operation of this sliding lock 114, 116 structure will be described in detail below.

The cylindrical collar 62 that interconnects the upper bead breaker 10 and the cylindrical power column 61 at the top of the power column is part of the upper bead breaker 10, the collar having an inside diameter relative to the power column's outside diameter that allows it to be telescoped over and axially slidable relative to the power column. The slidability of the collar 62 (and, hence, the upper bead breaker 10) relative to the power column 61 provides structure that allows the machine's operator to position the upper bead breaker's blade 44 on the top side wall 45 of the tire 14 being demounted regardless of the tread width W of the tire on the machine's table 12. Further, the slidability of the collar 62 relative to the power column 61, in combination with the concentricity of the collar/power column structure, allows the upper bead breaker 10 to be swung outwardly out of the way when the tire/wheel is being lifted on or off the table 12, i.e., allows the upper bead breaker to be swung into a plane transverse to the plane in which it is shown in all the figures, so that it is off to one side of the table 12 where it does not impede locating the tire/wheel on, or removing the tire/wheel from, the table. Handle 98 is permanently fixed to the collar 62, and extends radially from the collar, to aid the operator in lifting or moving the upper bead breaker 10 upwardly along the power column 61 when so desired by the operator.

A latch 107 is adapted to cooperate with the upper bead breaker 10 and the power column 61. The latch 107 serves to maintain the upper bead breaker mechanism in its preset location on the power column when the upper bead breaker is in use, i.e., when the tire's upper bead 22 is being broken from the wheel's upper rim 15a. The latch 107, and its structural elements and its function, is more particularly illustrated in U.S. Pat. application Ser. No. 238,015, entitled POWER COLUMN LATCH, invented by David W. Besuden, filed Jan. 30, 1973, now U.S. Pat. No. 3,827,474.

The second or bead breaker's power unit 46 and power column 61 are located between the main frame side walls' planes, see FIG. 1. The power column 61 is permanently fixed to a U-shaped bracket 108 at its bottom end, the U-shaped bracket's arms being pivotally connected to a crossbar 63 permanently fixed to the power unit, thereby pivotally connected, on axis 120, the upper bead breaker 10 and power column 61 to the power unit 46. The power unit's crossbar 63 extends between and beyond the main frame's side walls 29, and each end 121 of the crossbar is captured in a vertical slot 122 defined in each of the main frame's side walls. Thus, the upper bead breaker 10 is adapted for vertical movement in the general straight line path 41 as will be explained in detail below, and establishes a substantially in-line power thrust transfer from the power unit 46 to the upper bead breaker.

A U-shaped holder or cradle 119 is mounted to the main frame 28, the arms 123 of the cradle being fixed to side walls 29 of the main frame, see FIGS. 1, 5 and 6. The cradle 119 functions as a support for the power column 61 when same is in the home or nonoperative attitude illustrate in FIG. 5, the power column falling clockwise about the pivot axis 120 into home or supporting contact with the cradle's base 124 when not in operational relation with the tire 14. Thus, and by virtue of the pivotal connection 63 between the power column 61 and the power unit 46, the upper bead breaker 10 can be manually moved between a home or rest position where it is supported by cradle 119 (see FIG. 5) and an operating position where it is operatively engaged with the tire 14 and wheel 13 (see FIG. 6).

Power Unit

The second or bead breaker's power unit 46 is in the form of a fluid motor that may be either pneumatically or hydraulically driven, although a pneumatic motor is illustrated. The pneumatic motor 46 includes housing 128 (on which ear 129 is fixed at the bottom end) and an extensible piston rod 130 (on which ear 131 is fixed at its top or exposed end), see FIGS. 5 and 6. The bottom ear 129 carries crossbar 63, thereby pivotally interconnecting the motor's housing 128 with the power column 61 (and, hence, with the upper bead breaker 10) at the column's bottom end. The top ear 131 carries crossbar 132 to which the lower bead breaker 43 is pivotally connected on an axis 133 thereby pivotally interconnecting the motor's piston rod 130 with the lower bead breaker. The piston rod 130 is mounted to piston head 134 interiorly of the housing 138, thereby dividing the housing into chambers 135, 136. Check valve 137 to atmosphere is provided for chamber 135, but chamber 136 is connected (as is described below) to a high pressure air source through source line 138 such as is found in gasoline stations and the like. The check valve 137 admits atmospheric air into chamber 135 when piston head 134 is being retracted into motor housing 128, but prevents chamber 135 from being exhausted to atmosphere therethrough as piston rod 130 is extended from the housing. Chamber 135 air is exhausted from the motor housing 128 by leaking out around piston rod 130; this provides a dashpot effect and prevents the bead breakers 10 or 43 from rapid movement (and, thereby, prevents the machine from shock forces) if one of the tire's beads suddenly and totally breaks away from the wheel's rims during operation of the power unit 46.

Motor springs 139 are located on the outside of the main frame's side walls 29, and are provided to continually bias or load the fluid motor's housing 128 into the home position as illustrated in FIG. 5. Thus, motor springs 139 also continuously bias the upper bead breaker 10 toward the home or rest position since same is pivotally connected (as at 63) to the motor housing 128. Each of the springs 139 is attached at one end to a pin 140 mounted on a side wall 29, of the main frame 28, and attached at the other end to the extension ends 121 of the crossbar 63 which is pivotally connected with the power column 61, see FIG. 1. Note that the springs 139 are located exteriorly of the main frame's side walls 29, and that the power column's bracket is located interiorly of the main frame's side walls thereby trapping each side wall between a spring and the bracket so as to positively maintain the crossbar 63 within the vertical slots 122 defined in the frame's side walls during operation of the machine.

The pneumatic circuit for control of the fluid motor is controlled by means of a foot pedal 141 adjacent the base of the machine, see FIGS. 1 and 5. The foot pedal 141 is interconnected by rod 142 with a spring loaded three-way valve 143. The valve 143 is interconnected with power chamber 136 of the pneumatic motor 46 at motor port 144 and through line 138. The three-way valve 143 is continually biased toward vent port 145 by tension spring 146, thereby continuously opening power chamber 136 of the fluid motor 46 to atmosphere through line 138 unless the foot pedal 141 is actuated by the machine's operator. The three-way valve 143 is also connected with a high pressure air source, not shown, (through source port 147) such as commonly is found in gasoline stations and the like. Thus, when power chamber 136 is supplied with high pressure air through three-way valve 143 upon actuation of the foot pedal 141, the piston head 134 moves upwardly in the housing (air in static chamber 135) being exhausted to atmosphere through the motor housing port through which piston rod 130 extends. This forces the top crossbar 132 upwardly (to which the lower bead breaker 43 is interconnected, as will be explained in detail below), thereby breaking the tire's lower bead 23 from the wheel's lower rim 15b. When the piston 134 reaches its upper travel limit (due to structure associated with the lower bead breaker 43 as will be explained in further detail below), the fluid motor's housing 128 moves downwardly against the spring 139 forces. This forces the bottom crossbar 63 downwardly in a restricted linear path defined by the vertical slots 122 in the main frame's said walls 29, thereby drawing the power column 61 (and, hence, the upper bead breaker 10) downwardly so as to break the tire's upper bead 22 from the wheel's upper rim 15a. Upon release of the foot pedal 141 by the operator, the spring 146 loaded valve returns to vent port 145 so that power chamber 136 of the fluid motor 46 is vented to atmosphere. When the motor's power chamber 136 is vented to atmosphere, springs 139 function to retract the motor's housing 128 upwardly relative to the slots 122, thereby returning the motor housing (and the upper bead breaker 10 to the home position while drawing air into the chamber 135 through check valve 137.

Lower Bead Breaker Mechanism

The lower bead breaker mechanism 43 includes the slightly curved blade 49 that defines a leading edge 152, and that is oriented to contact the lower bead 23 area of a tire's lower side wall 50 with its top face 153, see FIGS. 1, 5 and 6. The blade 49 is integral with an arm 154 at each end thereof, the arms 154 (and, therefore, the blade 49) being pivotally connected to the power unit's top crossbar 132 at elbows 155 to establish pivot axis 133.

The lower bead breaker's blade 49 is spring 156 loaded. This spring loading continually biases blade 49 to move about pivot axis 133 toward the table 12, i.e., in a counter-clockwise direction as illustrated in the Figures, and continually biases the blade 49 toward the rest or home psoition where piston rod 130 is fully retracted into motor housing 128. A spring 156 is connected at one end to a pin 157 fixed on each arm 154 adjacent the arm's foot 158, and is connected at the other end to pin 159 fixed to the main frame's side wall 29 adjacent the main frame's feet 30. A stop 160 is fixed to the outside of each of the main frame's side walls 29, the stop being positioned to cooperate with the cam toe 161 of each lower bead breaker's arms 154 as will be described in detail below.

Control arms 162 are connected with the lower bead breaker$_s$ blade 49 and pneumatic motor 46 to guide or control the general upward path 42 of the blade when the motor is energized. A control arm 162 is pivotally mounted to each side wall 29 at one end by pin 163 to provide pivot axis 164, and is also pivotally connected to the motor's upper crossbar 132 at the other end on pivot axis 133. These control arms 162 (both of which have the common pivot axis 164 where they are connected to the main frame's side walls 29) function to allow the pivotal interconnection of the lower bead breaker's blade 49 with the fluid motor's crossbar 132 to track in a generally upward path 42, thereby providing a simple means during use to stabilize the pivot axis 133 of the lower bead breaker's blade 49 as the blade is being moved upwardly by the motor 46 and as the blade is pivoting on the upper crossbar 132 due to springs 156.

The lower bead breaker 43 also includes a travel limiter assembly 165 that functions to limit the upward travel of the lower bead breaker's blade 49 if desired by the machine's operator, see FIGS. 5 and 6. Each of two travel limiter arms 166 is notched at the upper end to define a seat 167, this seat being adapted to function as an abutment for bar 168 fixed to and extending between the control arms 162. The travel limiter arms 166 are continuously spring 169 loaded about pivot axis 171 (defined by pinning the arms to the frame's side walls) to that attitude illustrated in FIGS. 5 and 6, and are connected with that spring 169 by means of a positioner arm 170 which extends from beneath the table 12 beyond the machine's shroud 31 where it is readily accessible to the operator.

Normally the positioner arm 170 is located for use with a narrow tread width W tire, i.e., in location as shown in FIGS. 5 and 6, since it is continuously spring 169 loaded in that direction. When the travel limiter assembly 165 is in this operational attitude, and as the lower bead breaker's blade 49 is moved upwardly by the fluid motor 46, bar 168 (which connects the control arms 162) tracks or rides on edges 172 of the travel limiter arms 166. Thus, the interengagement of the lower bead breaker's bar 168 with the travel limiter arms' seats 167 is assured so as to limit the upward travel movement of the lower bead breaker's blade 49.

When the positioner arm 166 are drawn to the left (as viewed in FIGS. 5 and 6) by manually grasping the positioner arm 170, seats 167 are removed from the travel path of the bar 168 that joins the control arms 162, thereby allowing the lower bead breaker's blade 49 to continue in its upward travel until edges 173 of the control arms 162 engage the underside or base rim 174 of the table 12. The lower bead breaker 43 and travel limiter assembly 165, their structural elements and operation, are more particularly set out in U.S. Pat. application Ser. No. 328,017, entitled BREAD BREAKER MECHANISM, invented by John T. Curtis, filed Jan. 30, 1973, now U.S. Pat. No. 3,807,477.

DETAILED OPERATION OF BEAD BREAKER MECHANISM

In use, the home or fully retracted position of the upper 10 and lower 43 bead breakers and of the fluid motor 46, are illustrated in FIG. 5. As shown in that Figure, the upper bead breaker 10 is spaced from the tire's upper side wall 45, and the power column 61 is pivoted about axis 120 to its rest position against the base 124 of cradle 119. Further, the lower bead breaker 43 is retracted away from the table 12 and out of contact with the tire's lower side wall 50. The power chamber 136 of the fluid motor 46 is vented to atmosphere through vent port 145 in the three-way valve 143, and static chamber 135 is vented to atmosphere through the motor housing port through which piston rod 130 extends. Thus, pressure in both chambers 135, 136 of the pneumatic motor 46 is atmospheric. This motor 46 condition allows springs 139 to fully retract the motor's housing 128 and crossbar 63 up to the top end of the vertical slots 122 in the main frame's side walls 29, thereby pushing the power column 61 and, hence, the upper bead breaker 10, up into the home position shown in FIG. 5. This motor 46 condition also allows springs 156 to fully retract the piston rod 130 into the motor housing 128, thereby retracting the lower bead breaker's blade 49 into the home position also shown in FIG. 5. The lower bead breaker's blade 49 is fully retracted out of contact with the table 12, as the piston rod 130 is drawn into the housing 128 by the springs 156, by virtue of cam toes 161 on the blade's arms 154 which ride up on stop blocks 160 fixed to the main frame's side walls 29, as the piston rod 130 bottoms out into the motor's housing 128. This causes the lower bead breaker's blade 49 to pivot away from the centerpost 32 (clockwise as shown in the Figures) against the bias of springs 156. The travel limiter assembly 165, unless manually withdrawn from position with the lower bead breaker's bar 168, is spring 169 loaded into that position so that edges 172 of the travel limiter arms 166 are loaded against the lower bead breaker's bar 168.

Prior to commencing operation of the bead breaker mechanism 10, 43, the upper bead breaker's blade 44 is positioned in operable relation to a tire's top side wall 45 and the wheel's top rim 15a as illustrated in FIG. 6 (i.e., on top the tire's top side wall) by manually pivoting power column 61 about axis 120, thereby pivoting same toward the centerpost 32 and off the base 124 of cradle 119. In addition, the locater housing's restrainer bar 111 is positioned in the inside seat 113 defined in the wheel 13 between the wheel's rim 15a and well 16, thereby positively holding the upper bead breaker's blade 44 in the desired relation to the wheel rim's outer surface 21 throughout the upper bead breaker's operational sequence, i.e., throughout the travel path 47 of the blade's leading edge 65. This for the reason that the locater housing 91 is pivotally fixed to the upper bead breaker's support arm 68 at axis 92 and is pivotally held in place relative to the wheel 13 by virtue of restrainer bar 111 being located in seat 113.

Power column latch 107 associated with the upper bead breaker 10 maintains the upper bead breaker in fixed position on the power column 61 during the upper bead breaker blade's operational sequence, the structure and operation of that latch being more particularly set out in U.S. patent application Ser. No. 328,015, entitled POWER COLUMN LATCH, invented by David W. Besuden, filed Jan. 30, 1973, now U.S. Pat. No. 3,827,474.

After the upper bead breaker 10 has been operationally located as illustrated in FIG. 6, the operator depresses foot pedal 141, thereby casing the bead 22, 23 breaking operational sequence to be carried out automatically until both beads are broken away from the wheel's rims 15a, 15b, i.e., are moved into the well 16 area of the wheel. When the foot control pedal 141 of the pneumatic circuit is depressed, three-way valve 143 is biased against spring 146 to the high pressure air port 147. This introduces high pressure air into the fluid motor's power chamber 136 through line 138, thereby forcing the piston 134 toward the top of the motor housing 128 from the bottom of that housing. As the piston 134 is forced toward the top of the motor's housing 128, the lower bead breaker's blade 49 is moved upwardly (since it is connected to piston rod 130 through crossbar 132), see FIG. 6. As the lower bead breaker's blade 49 is moved upwardly, the lower bead breaker's feet 158 are lifted off the stationary stop blocks 160, thereby allowing the lower bead breaker's blade to pivot about axis 133 toward the centerpost 32, i.e., in a counter-clockwise direction as illustrated in the Figures. It is important to note that, once the lower bead breaker's feet 158 are removed from interengagement with the stop blocks 160, the leading edge 152 of the lower bead breaker's blade 49 contacts the table 12 and rides up on the table's surface until it hits the wheel's lower rim 15b. As the pneumatic motor 46 continues to move the lower bead breaker's blade 49 upwardly, the blade rides up on the wheel's rim 15b and tracks or follows the rim's contour until the tire's lower bead 23 is displaced into the wheel's well 16. This tracking function of the lower bead breaker's blade 49 is a result of the spring 156 loading provided, that spring loading tending to rotate the lower bead breaker's blade in the counterclockwise direction as illustrated in the Figures.

Once the lower bead breaker 43 has 'topped out', i.e., once the lower bead breaker has either abutted against the seats 167 defined by the travel limiter arms 166 (if those arms are in operational position) or once the control arms 162 have abutted the table's base rim 174 (if the travel limiter assembly 165 has been retracted by use of the positioner arm 170), the pneumatic motor's housing 128 begins to move downwardly in response to the continued pneumatic pressure in power chamber 136. This downward motion of the motor's housing 128 is occasioned because of the fact that the motor's piston head 134 is now in a fixed location and unable to move upward any further (either because lower bead breaker's bar 168 is interengaged with the travel limiter arms seats 167 or because the control arms 162 are abutted against the bottom edge 174 of the machine's table 12). This for the reason that the high pressure air in the fluid motor's power chamber 136 provides downward force on the bottom of the motor's housing 128 sufficient to overcome the spring 139 loading in the upward direction. The downward motion of the fluid motor's housing 128 is, of course, translated into downward motion for the power column 61 and upper bead breaker 10 because the power column is directly connected with the housing by crossbar 63 at pivot axis 120. The downward motion of the fluid motor's housing 128 is vertical in nature because of the vertical slots 122 in the main frame's side walls 29, thereby guiding the upper bead breaker 10 downward in a generally vertical, straight line path.

The operational or travel path 47 that the leading edge 48 of the upper bead breaker's blade 44 follows, after the power unit 46 has been energized, is illustrated in FIG. 4 in diagrammatic fashion and in FIGS. 6–9 in sequence fashion. As shown in FIG. 4, the travel path 47 is made up of three distinct and separate components or segments 176–178. The first segment 176 of the path 47 is a vertically downward one (directed toward the floor on which the machine rests) that, in practice, may be about three-eighths of an inch in length. This first segment moves the blade 44 beneath the rim's top flange 18 so it does not ride over that flange, i.e., ride over the rim's outer edge 17, when moving through the path's second segment 177, see FIG. 7. The second segment 177 is a radially inward one (directed toward the centerpost 32) that may be, for example, about nine-sixteenths of an inch in length. This second segment drives the blade 44 radially inwardly toward the rim's floor 19 beneath the rim's flange 18 to locate the blade's minor lip 64 directly on top of the tire's top bead 22, see FIG. 8. The third segment 178 of the path 47 is another vertically downward one that, for example, may be about one and five-eighths inches in length. This third segment causes the tire's bead 22 to be completely removed from the wheel's rim into the well 16 area, see FIG. 9. This path 47 is a discrete and completely programed one that the upper bead breaker blade's leading edge 48 follows time after time (because of the structure of the upper bead breaker 10) as the upper bead breaker 10 is drawn downwardly by the power column 61 in response to the second power unit.

The exact operational sequence of the structure that comprises the upper bead breaker 10 is illustrated in FIGS. 6–9. The initial or start position of the upper bead breaker 10, is illustrated in solid lines in FIG. 6 and in phantom lines in FIG. 7. In this start position the upper bead breaker's blade 44/slip shoe 80 combination has been seated in place on top the tire's top side wall 45, and the locater housing's retaining bar 111 has been seated in the inside seat 113 defined on the inside surface of the wheel 13 between the wheel's rim 15a and the wheel's well 16. This positively locates the upper bead breaker 10 on the tire's top side wall 45 in operational position prior to commencing the blade's travel path 47 for breaking the tire's upper bead 22 away from the wheel's upper rim 15a, i.e., prior to energization of the second power unit 46. Further, the positioning of the restraining bar 111 in the inside seat 113, and the pivotal mounting of the locater housing 91 to the support arm 68 on pivot axis 92, serves to maintain a positive and distinct spatial relationship, i.e., operational relationship, of the upper bead breaker's blade 44 relative to the rim's outer surface 21 as the upper bead breaker is caused to move through an operational cycle in response to the second power unit 46.

Figures 7, 8, 9:
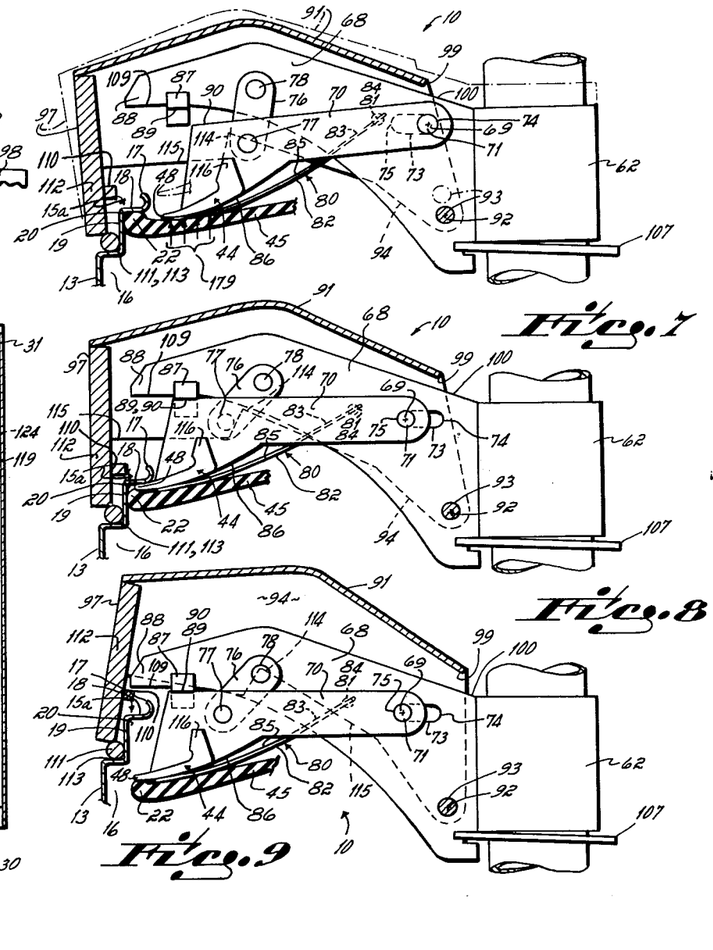
FIG. 7 is a side view of the upper bead breaker by itself, the initial or starting position of the upper bead breaker being illustrated in phantom lines, and the position of the upper bead breaker at the end of the blade travel path's first segment being illustrated in solid lines.
FIG. 8 is a view similar to FIG. 7 illustrating the position of the upper bead breaker at the end of the blade travel path's second segment.
FIG. 9 is a view similar to FIGS. 7 and 8 while illustrating the position of the upper bead breaker at the end of the blade travel path's third segment, i.e., in its final or end position.

The first segment 176 of the upper bead breaker blade's path 47 is shown more particularly in FIG. 7. As shown in that Figure, the upper bead breaker's blade 44 and slip shoe 80 are drawn vertically downward (note difference in position between phantom outline of blade 44 and full view thereof), and the locater housing 91 pivots from the phantom line position to the solid line position, as the power column 61 is drawn downwardly by the fluid motor 46, during the travel path's first segment 176. This vertically downward motion of the blade 44/slip shoe 80 is achieved against opposing forces (represented by force lines 179) against the underside of the upper bead breaker's blade and slip shoe because of the resistance offered by the tire's upper side wall 45. This vertically downward motion of the upper bead breaker's blade 44/slip shoe 80 is programed and predetermined because the pivotal connection 71 of the blade's arms 70 with the support arm 68 is restrained at the radially outer end 74 of slots 73 (relative to the machine's centerpost 32) through interengagement of the locater housing's lock notch 114 with the upper bead breaker blade's lock bolt 116 during the first segment 176. That is, the leading edge 65 of the upper bead breaker's blade 44 is initially forced to travel substantially straight down (as the power column 61 is drawn downwardly) until the lock bolt 116 escapes the lock notch 114 in the locater housing 91 because the lock so established prevents radially inward movement of the blade's leading edge (as subsequently permitted by the slot 73/link 76 structure) until the bolt 116 is removed from the notch 114. As the blade proceeds through this first segment 176, the lock bolt 116 slides or moves out of the lock notch 114 because the blade 44 is being drawn downwardly relative to the locater housing 91. The locater housing 91 is fixed against vertical downward movement at one end by restrainer bar 111 located in the wheel's inside seat 113, and is pivotally connected at the other end to support arm 68. Thus, and as the power column 61 (and, hence, support arm 68) are moved downwardly during the path's first segment, the locater housing 91 tends to be opened or lifted off the support arm 68 in clamshell fashion about pivot axis 92, thereby allowing the blade's lock bolt 116 to escape completely from the lock notch 114 as the blade's leading edge 65 reaches the end 180 of its first segment 176 (which is the start of its second segment 177). This initial or first segment of the upper bead breaker blade's path 47 (as shown in FIGS. 4 and 7) results in the leading edge 65 of the upper bead breaker's blade 44 being positioned beneath the wheel rim's outer edge 17 and flange 18 so that it may be subsequently driven in between the flange 18 and tire's upper bead 22, i.e., results in the upper bead breaker blade's leading edge 65 being lowered from a horizontal plane where it is located at the top edge 17 of or slightly above the top edge of the wheel 13 (as shown in FIG. 6) to a horizontal plane where it is located slightly beneath the rim's flange 18.

Once the upper bead breaker's blade 44 has completed the initial segment 176 of its travel path 47, i.e., once the blade's lock bolt 116 has escaped capturing confinement with the locater housing's lock notch 114, the upper blade moves radially inward toward the centerpost 32 along the intermediate or second segment 177 of its travel path. This radially inward movement of the upper bead breaker blade (compare FIG. 7 to FIG. 8) is occasioned because the resistive force (indicated by force lines 179) provided by the tire's side wall 45 causes the links 70 to collapse toward the centerpost 32, i.e., cause the links to pivot clockwise (as shown in the Figures) about pivot 78, because the links 70 are biased or angled slightly toward the wheel's rim 15a from their fixed pivot axis 78 on support arm 68. This collapse of the links 70 toward the centerpost 32, in combination with the slidable pivot connection of the upper bead breaker blade's arms 70 with the support arm 68 on axis 69, allows the blade 44 to move radially inward because the slot 73 permits radially inward motion of the blade arm's pins 71. The radially inward movement of the upper bead breaker blade's leading edge 65 is terminated when top edges 90 of the blade arms 70 engage seats 89 defined by stop blocks 87, and when pins 71 reach the inner ends 75 of the slots 73 on the support arm. At this point the upper bead breaker's blade is once again bound up into a single mass with the support arm 68, and can only move downwardly thereafter. This second segment 177 of the path 47 results in the blade's minor lip portion 64 being positioned directly above the tire's upper bead 22 when it reaches the end 181 of the second segment (which is the start of the third segment 178). The slip shoe 80 aids the upper bead breaker's blade 44 in its radially inward movement in that it provides a low friction surface (as opposed to the high friction rubber tire wall 45 surface) over which at least a portion of the upper bead breaker's blade can easily slide in traversing the second or intermediate segment 177 of its travel path 47. Further, the slip shoe 80 tends to bridge the tire's side wall 45 in that area contacted by the upper bead breaker's blade 44, thereby insuring an adequate resistive force (see force lines 179) sufficient to collapse the linkage 70. That is, and particularly in the case of a tire having a 'soft' side wall 45, the slip shoe 80 accumulates the resistive force generated by the side wall 45, and prevents that side wall from tending to envelop the blade 44, thereby insuring the blade 44 will move radially inward as desired time after time. Thus, the linkage 70 and laterally movable pivot 69 connections of the upper bead breaker's blade 44 with the support arm 68 allow the blade's leading edge 65 to scoot or move forward in a substantially straight path when resistive forces 179 are provided against the underside of the blade once the blade's lock bolt 116 has escaped from the locater housing's notch 114, this radially inward motion being limited by interengagement of the blade arms 70 with the stop blocks 87 fixed to the support arm 68.

FIG. 9 shows the final or third segment 178 of the upper bead breaker blade's travel path 47. As shown in that Figure, the blade's leading edge 65 is moved substantially vertically downward during this third segment 178 because of the fact that the blade 44 is now locked in its radially inward position as discussed above, and because the power column 61 continues to draw the upper bead breaker 10 downwardly, compare FIG. 8 to FIG. 9. Again during this portion of the blade's path 47, restrainer bar 111 fixed to the locater housing 91 maintains the blade's leading edge 65 in operational proximity with the wheel rim's outer surface 21 (even though the restrainer bar is fixed relative to the downward movement of the power column 61 and rest of the upper bead breaker 10 structure) because the locater housing is pivoted to the support arm on pivot axis 92. Therefore, the blade's minor lip 65 is moved vertically downward while being held in a fixed relation relative to the wheel rim's outer surface 21, this last leg 178 of the path 47 being substantially vertical because of the vertically downward thrust provided thereon by the power column 61.

As mentioned, the first segment 176 of the upper bead breaker blade's path 47 is necessary to position the blade's leading edge 65 beneath the wheel rim's flange 18 so that the blade does not ride over the flange when it is directed inwardly in the second segment 177 of the path. The second segment 177 of the blade's path 47 is functionally necessary so the blade's minor lip 64 can be positively driven in closely adjacent the wheel's outer surface 21 to locate the minor lip of the upper bead breaker blade, i.e., the leading edge 65 thereof, in operational position on top of the tire's upper bead 22. The third segment 178 of the blade's path is, of course, necessary to totally break the upper bead 22 away from the wheel's rim 15a. This operational sequence of the upper bead breaker 10 does not rely on the upper bead breaker blade 44 tracking on or rubbing against the outer surface 21 of the wheel's rim 15a; this operational path of the upper bead breaker's blade provides a positive tracking action that is controlled solely by the structure of the upper bead breaker 10, i.e., it provides an automatic tracking upper bead breaker that tracks from an initial side wall seated position as shown in FIG. 6 into a total bead breaking position shown in FIG. 9 without blade 44 contacting the wheel 13 at all.

The overall downward movement of the fluid motor's housing 128 (and, hence, of the upper bead breaker 10 and its blade 44,) and more particularly the downward movement of the upper bead breaker's blade 44 during the third segment 178 of the blade's path 47, is usually terminated when crossbar 63 bottoms out against the bottom end of the vertical slots 122. At this bottomed out location the motor's piston rod 130 and housing 128 are fully extended relative one to the other, and the tire's upper bead 22 has been broken away from the wheel's rim 15a as well as the tire's lower bead 23 has been broken away from the wheel's bottom rim 15b. However, and under certain operational conditions, the overall downward movement of the fluid motor's housing 128, i.e., the downward movement of the upper bead breaker's blade 44 during the third segment 178 of the blade's path 47, is terminated before the crossbar 63 bottoms out against the bottom end of the vertical slots 122. This could occur because of the structure of the upper bead breaker 10 itself which includes top block 110 fixed to the inside of housing 91. If the under edge 109 of the support arm's nose 88 contacts stop block 110 before crossbar 63 bottoms out against the bottom ends of the vertical slots 122, further pivotal movement of the locator housing 91 relative to the support arm 68 is prevented; this, in turn, prevents further downward movement of the power column 61 since the locator housing's restrainer bar 111 is seated in the rim's inner seat 113. In this alternative bottomed out location for the upper bead breaker 10, the tire's upper bead 22 will have been broken away from the wheel rim 15a as well as the tire's lower bead will have been broken away from the bottom rim 15b. Whether the overall downward movement of the upper bead breaker's blade 44 is terminated by crossbar 63 bottoming out against the bottom end of vertical slots 122 (see FIG. 9), or whether it is terminated by interengagement of the locator housing's stop block 110 with the nose 88 of the upper bead breaker arm 68 (which position is not shown), is mainly dependent on the latched location of the upper bead breaker's collar 62 on power column 61 when same is disposed in the initial operational position as illustrated in FIG. 6 and in phantom lines in FIG. 7. In effect, however, the stop block 110 functions as a kind of safety stop to prevent the support arm's nose 88 from engaging the rim's outer edge 17 and flange 18 no matter where the collar 62 is initially positioned on power column 61; such engagement would, because of the high force being exerted downward through the support arm 68, of course, cause damage to the rim.

After the tire's beads 22, 23 have been broken away from the wheel's rims 15a, 15b, the operator releases foot pedal 141. The spring 146 loading on the three-way valve 143 returns the valve to the vent port 145 attitude, thereby releasing the high pressure air from the power chamber 136 in the fluid motor 46. Once the motor's high pressure chamber 136 is exhausted to atmosphere, springs 139 cause the housing 128 to move upwardly until crossbar 63 abuts the top of the main frame's vertical slots 122, i.e., cause the motor's housing to return to the position illustrated in FIGS. 5 and 6. This return of the fluid motor's housing to the attitude illustrated in FIGS. 5 and 6 causes the power column 61 to move upwardly and, thereby, causes the upper bead breaker 10 to be returned to the initial or starting position illustrated in those Figures from whence it can be lifted out of operational contact with the tire 14. After the upper bead breaker 10 is lifted out of operational contact with the tire, locater housing 91 falls down or pivots about pivot axis 92 until locater housing's lock notch 114 engages the lock bolt 116 formed integral witth the upper bead breaker's blade 44, thereby returning the upper bead breaker 10 to the home or start position.

Further, the piston rod 130 is fully retracted into the fluid motor's housing 128 and the lower bead breaker 43 drawn downwardly because of springs 156 fixed at one end to the machine's main frame 28 and at the other end to the lower bead breaker arms 154. As the lower bead breaker's blade 49 is drawn downwardly by springs 156, same follows the contour of the wheel's outer surface 21 and of the table 12 in a reverse direction until feet 158 of the lower bead breaker's arms approach the stop blocks 160. As cam toes 161 engage the stop blocks 160, the lower bead breaker's blade 49 is pivoted clockwise as illustrated in the Figures so as to remove same from contact with the machine's table 12 back into the home or fully retracted attitude illustrated in FIG. 5.

The operation of the upper 10 and lower 43 bead breaker mechanisms have been described by indicating that the lower bead breaker 43 is first pushed upwardly, and the upper bead breaker 10 is subsequently pulled downwardly, by the fluid motor 46. Actual operation of the bead breakers 10, 43 may or may not follow this exact sequence. Indeed, in actual operation it may be the upper bead breaker 10 will move downwardly prior to the lower bead breaker 43 moving upwardly. However, and as is most often the case, actual operation of the machine 11 will generally result in both bead breakers 10, 43 moving toward one another in a substantially simultaneous manner. The exact sequence of the bead breaker 10, 43 operation is mainly dependent on the degree to which each of the tire's beads 22, 23 are stuck or adhered to the wheel's rims 15a, 15b. For example, if the tire's upper bead 22 is more tightly stuck or adhered to the wheel's upper rim 15a than is the tire's lower bead 23 stuck or adhered to the wheel's lower rim 15b, then the lower bead breaker 43 will move upwardly before the upper bead breaker 10 moves downwardly because there will be less resistance for the lower bead breaker to overcome than there is resistance for the upper bead breaker to overcome. However, in actual operation it will more likely be the case that the bead breakers 10, 43 will operate substantially simultaneously upon introduction of high pressure air to the power chamber 136 of the pneumatic motor 46 once the pedal has been depressed by the operator because it is most often the case that both of the tire's beads 22, 23 are roughly stuck to the same degree to the wheel's rims 15a, 15b.

Having described in detail the preferred embodiment of our invention what we desire to claim and protect by Letters Patent is:

1. An improved upper bead breaker mechanism for an automatic tire changer machine, said upper bead breaker mechanism being adapted to break a tire's upper bead away from a wheel's upper rim when said wheel is positioned on said machine's table, comprising
 a blade adapted to move downwardly along a programmed and controlled path, said path including
 a first downward segment relative to the plane of said table that locates the blade's lip beneath the wheel rim's flange from an initial operational position where said blade rests on the tire's side wall,
 a second radially inward segment relative to said wheel that locates the blade's lip over the tire's bead, and a third downward segment relative to the plane of said table that breaks the tire's bead away from the wheel's rim, a power column that interconnects said blade with a power unit for moving said blade downwardly through said programmed and controlled path against the upward resistance provided by the tire's side wall, at least one of said power column and said blade being pivotable about an axis between a storage position at which said blade is swung out of operational relation with said tire's side wall and a use position at which said blade is swung into operational relation with said tire's side wall, a restrainer device pivotally interconnected with said blade to maintain the blade's leading edge in operating proximity to the outer surface of the wheel's rim after said blade has been swung into operational relation with said tire's side wall and when said power unit is activated, said restrainer device including a restrainer bar adapted to seat on the inside surface of the wheel's upper rim, and lock means partially carried by said blade and partially carried by said restrainer device, said lock means serving to maintain said blade in a substantially vertically downward path relative to the plane of said table during the first segment of said travel path, said blade escaping that portion of said lock means carried by said restrainer device as it traverses said first segment until same is released therefrom at the end of said first segment so as to permit said blade to traverse said second segment immediately upon being so released.

2. An improved upper bead breaker mechanism as set forth in claim 1 further including
a slip shoe connected to said power column and positioned to cooperate with said blade, said slip shoe serving to reduce the frictional resistance as said blade is moved radially inward over the tire's side wall in the second segment of its travel path.

3. An improved bead breaker mechanism as set forth in claim 1 including
stop means that limits the radially inward movement of said blade, and that locates said blade in fixed position during use to maintain said blade in a substantially vertical downward path during the third segment of said travel path.

4. An improved upper bead breaker mechanism as set forth in claim 1 wherein said restrainer device includes a locater member that connects said restrainer bar to said blade, and wherein said lock means includes a lock notch in said locater member adapted to cooperate with a lock bolt on said blade.

5. An improved upper bead breaker mechanism as set forth in claim 1 including
a support arm connected to said power column
structure defining a pivotal connection between said blade and said support arm, said pivotal connection being slidable between a radially inner and radially outer position on said support arm, and
an over-center link also connecting said blade and said support arm, said link and pivotal connection being arranged to cause said blade to move radially inward relative to a wheel in response to resistive forces provided by the tire's side wall on the underside of said blade.

6. An improved upper bead breaker mechanism as set forth in claim 5 including
a stop that limits the radially inward movement of said blade, said stop being in the nature of a stop seat fixed on said support arm adapted to engage and stop said blade at its radially inner position.

7. An improved bead breaker for an automatic tire changer machine, said bead breaker being adapted to break a tire's bead away from a wheel's rim, comprising
a blade connected to a power unit, said blade being directed against a tire's side wall by said power unit, and
a slip shoe interposed between said blade and said side wall, said slip shoe serving to aid said blade in its radially inward motion toward the wheel's center as said blade is directed against the tire's side wall.

8. An improved bead breaker as set forth in claim 7 including
a power column having a support arm, said blade being pivotally mounted to said support arm and said slip shoe being fixedly mounted to said support arm, said blade being slidable over said slip shoe.

* * * * *